United States Patent
Seo et al.

(10) Patent No.: US 10,630,446 B2
(45) Date of Patent: Apr. 21, 2020

(54) METHOD FOR TRANSMITTING ACK/NACK RESPONSE FOR BROADCAST SIGNAL/MULTICAST SIGNAL IN WIRELESS COMMUNICATION SYSTEM, AND DEVICE THEREFOR

(71) Applicant: LG ELECTRONICS INC., Seoul (KR)

(72) Inventors: Hanbyul Seo, Seoul (KR); Kijun Kim, Seoul (KR); Byounghoon Kim, Seoul (KR); Hyukjin Chae, Seoul (KR)

(73) Assignee: LG ELECTRONICS INC., Seoul (KR)

(*) Notice: Subject to any disclaimer, the term of this patent is extended or adjusted under 35 U.S.C. 154(b) by 31 days.

(21) Appl. No.: 15/759,824

(22) PCT Filed: Oct. 21, 2016

(86) PCT No.: PCT/KR2016/011897
§ 371 (c)(1),
(2) Date: Mar. 13, 2018

(87) PCT Pub. No.: WO2017/069559
PCT Pub. Date: Apr. 27, 2017

(65) Prior Publication Data
US 2018/0254872 A1    Sep. 6, 2018

Related U.S. Application Data

(60) Provisional application No. 62/367,122, filed on Jul. 27, 2016, provisional application No. 62/288,421, (Continued)

(51) Int. Cl.
*H04W 4/00* (2018.01)
*H04L 5/00* (2006.01)
(Continued)

(52) U.S. Cl.
CPC .......... *H04L 5/0053* (2013.01); *H04L 1/1816* (2013.01); *H04L 1/1861* (2013.01);
(Continued)

(58) Field of Classification Search
CPC ... H04L 5/0053; H04L 1/1816; H04L 1/1861; H04L 5/0055
(Continued)

(56) References Cited

U.S. PATENT DOCUMENTS

2006/0198377 A1 * 9/2006 Kubota ................. H04L 1/1671
370/394
2010/0296389 A1    11/2010 Khandekar et al.
(Continued)

FOREIGN PATENT DOCUMENTS

JP        2014030133        2/2014

OTHER PUBLICATIONS

PCT International Application No. PCT/KR2016/011897, Written Opinion of the International Searching Authority dated Feb. 8, 2017, 18 pages.

*Primary Examiner* — Sai Ming Chan
(74) *Attorney, Agent, or Firm* — Lee, Hong, Degerman, Kang & Waimey

(57) ABSTRACT

Disclosed in the present application is a method by which a terminal transmits and receives a signal. Particularly, the method comprises the steps of: receiving a downlink signal from a plurality of cells; transmitting, to a serving cell among the plurality of cells, an acknowledgement/negative ACK (ACK/NACK) response for the downlink signal; and receiving, from at least one cell among the plurality of cells, retransmission for the downlink signal.

12 Claims, 8 Drawing Sheets

Related U.S. Application Data filed on Jan. 28, 2016, provisional application No. 62/244,186, filed on Oct. 21, 2015.

(51) Int. Cl.
  *H04L 1/18* (2006.01)
  *H04L 1/00* (2006.01)
(52) U.S. Cl.
  CPC .......... *H04L 5/0055* (2013.01); *H04L 5/0007* (2013.01); *H04L 2001/0093* (2013.01)
(58) Field of Classification Search
  USPC ........................................................ 370/312
  See application file for complete search history.

(56) References Cited

U.S. PATENT DOCUMENTS

| | | |
|---|---|---|
| 2013/0188575 A1 | 7/2013 | Lee et al. |
| 2014/0079006 A1 | 3/2014 | Wu |
| 2015/0304992 A1* | 10/2015 | Nagata .................. H04L 1/1887 370/329 |

\* cited by examiner

E-UMTS (a) contol - plane protocol stack (b) user - plane protocol stack

Initial transmission     Retransmission

METHOD FOR TRANSMITTING ACK/NACK RESPONSE FOR BROADCAST SIGNAL/MULTICAST SIGNAL IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2016/011897, filed on Oct. 21, 2016, which claims the benefit of U.S. Provisional Application No. 62/244,186, filed on Oct. 21, 2015, 62/288,421, filed on Jan. 28, 2016, and 62/367,122, filed on Jul. 27, 2016, the contents of which are all hereby incorporated by reference herein in their entirety.

TECHNICAL FIELD

The present invention relates to a wireless communication system, and more particularly, to a method for a terminal to transmit an ACK (acknowledgement)/NACK (negative ACK) response in response to a broadcast signal/multicast signal in a wireless communication system and an apparatus therefor.

BACKGROUND ART

As an example of a wireless communication system to which the present invention is applicable, a 3rd Generation Partnership Project (3GPP) Long Term Evolution (LTE) communication system will be schematically described.

FIG. 1 is a diagram showing a network structure of an Evolved Universal Mobile Telecommunications System (E-UMTS) as a wireless communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include an AG, a network node for user registration of the UE, etc. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE OF THE INVENTION

Technical Task

Based on the aforementioned discussion, a method of transmitting an ACK/NACK response in response to a broadcast signal/multicast signal in a wireless communication system is proposed in the following.

Technical Solution

To achieve these and other advantages and in accordance with the purpose of the present invention, as embodied and broadly described, according to one embodiment, a method of transmitting and receiving a signal, which is transmitted and received by a user equipment (UE) in a wireless communication system, includes the steps of receiving a downlink signal from a plurality of cells, transmitting an ACK/NACK (Acknowledgement/Negative ACK) response to a serving cell among a plurality of the cells in response to the downlink signal, and receiving a retransmission for the downlink signal from at least one cell among a plurality of the cells.

To further achieve these and other advantages and in accordance with the purpose of the present invention, according to a different embodiment, a user equipment (UE) in a wireless communication system includes a wireless communication module and a processor configured to receive a downlink signal from a plurality of cells, the processor configured to transmit an ACK/NACK (Acknowledgement/Negative ACK) response to a serving cell among a plurality of the cells in response to the downlink signal, the processor configured to receive a retransmission for the downlink signal from at least one cell among a plurality of the cells.

Preferably, a resource for transmitting the ACK/NACK response or a reference signal transmitted together with the ACK/NACK response is cell-specific. And, the downlink signal may correspond to a broadcast signal or a multicast signal transmitted from a plurality of the cells.

Additionally, when the ACK/NACK response is transmitted, channel quality with the serving cell is measured and a resource, which corresponds to the channel quality with the serving cell, for transmitting the ACK/NACK response or a reference signal, which corresponds to the channel quality with the serving cell, transmitted together with the ACK/NACK response can be selected. More preferably, channel quality with at least one adjacent cell is measured and information on the channel quality with the at least one adjacent cell can be transmitted to the serving cell together with the ACK/NACK response. In this case, the at least one cell can be selected based on the channel quality with the serving cell and the channel quality with the at least one adjacent cell.

Advantageous Effects

According to embodiments of the present invention, a terminal can more efficiently feedback an ACK/NACK response in response to a broadcast signal/multicast signal received from multiple cells in a wireless communication system.

It will be appreciated by persons skilled in the art that that the effects that can be achieved through the present invention are not limited to what has been particularly described hereinabove and other advantages of the present invention will be more clearly understood from the following detailed description.

BEST MODE

Mode for Invention

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

In addition, in the present specification, the term "base station" may include a remote radio head (RRH), an eNB, a transmission point (TP), a reception point (RP), a relay, etc.

Figure 1:
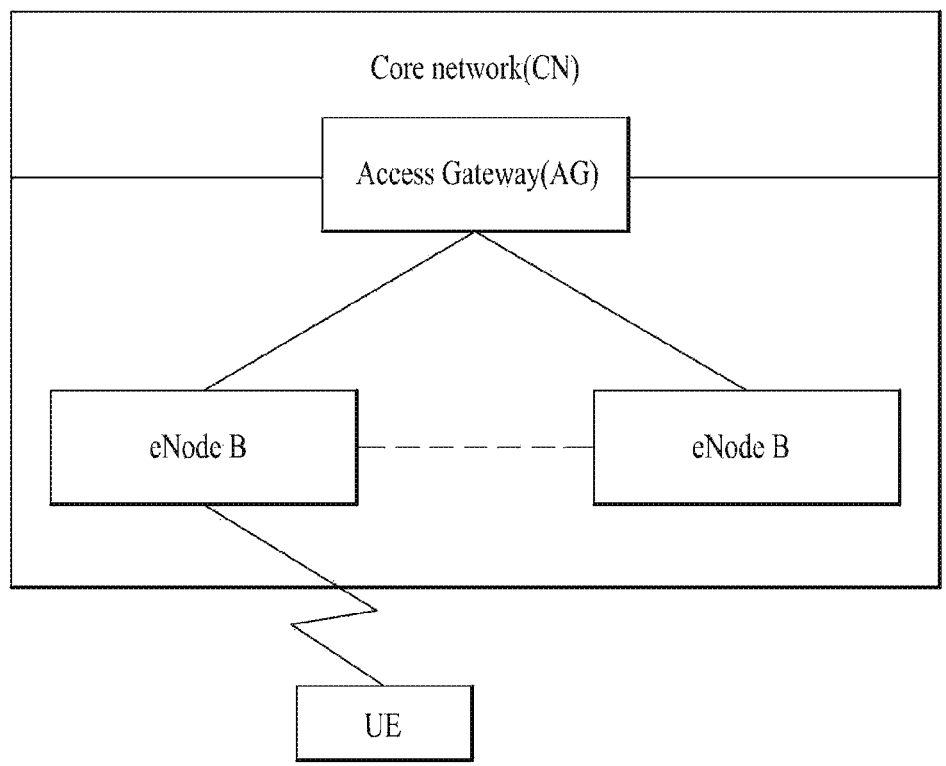
FIG. 1 is a diagram showing a network structure of an Evolved Universal Mobile Telecommunications System (E-UMTS) as an example of a wireless communication system.
Figure 2:
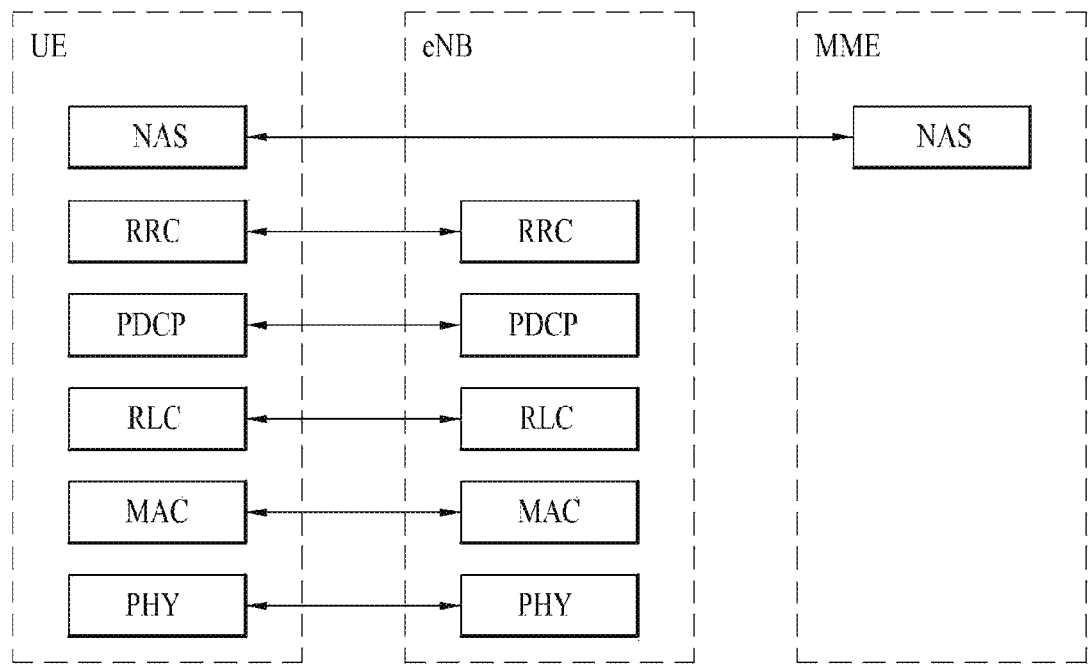
FIG. 2 is a diagram showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard.
Figure 2:
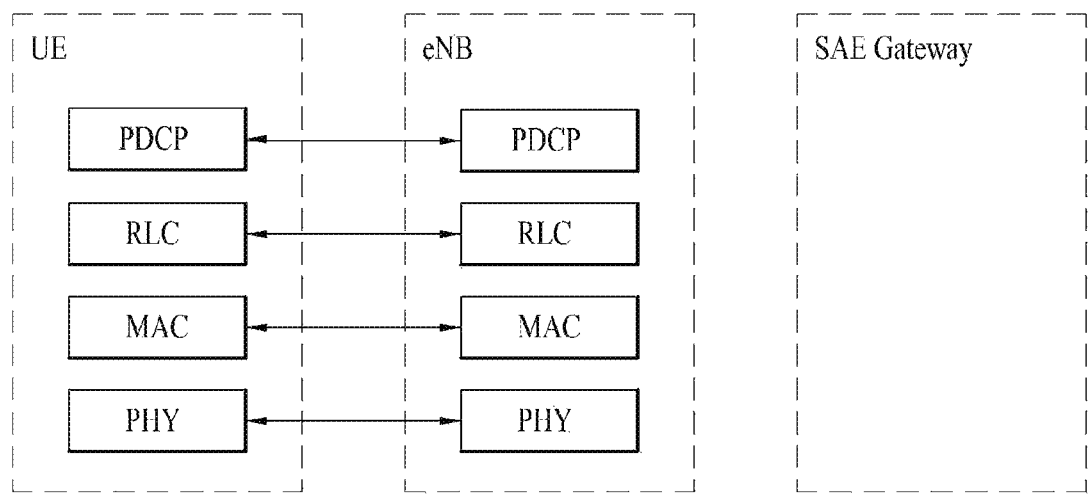

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
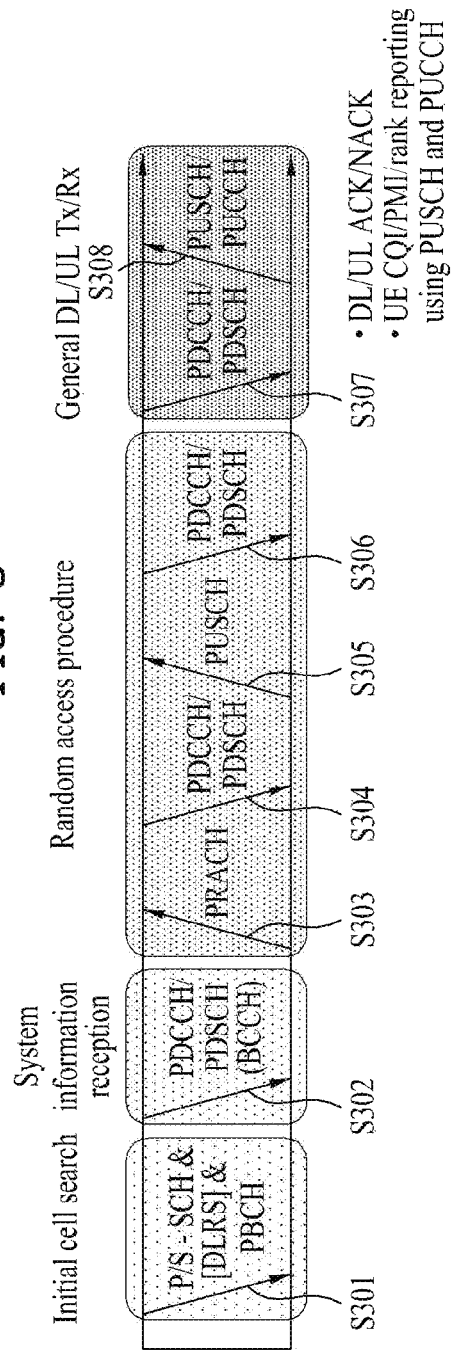
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE, which has completed the initial cell search, may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE, which has performed the above procedures, may perform PDCCH/PDSCH reception (S307) and Physical Uplink Shared Channel PUSCH)/Physical Uplink Control Channel (PUCCH) transmission (S308) as a general uplink/downlink signal transmission procedure. In particular, the UE receives downlink control information (DCI) through a PDCCH. Here, the DCI includes control information such as resource allocation information of the UE and the format thereof differs according to the use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
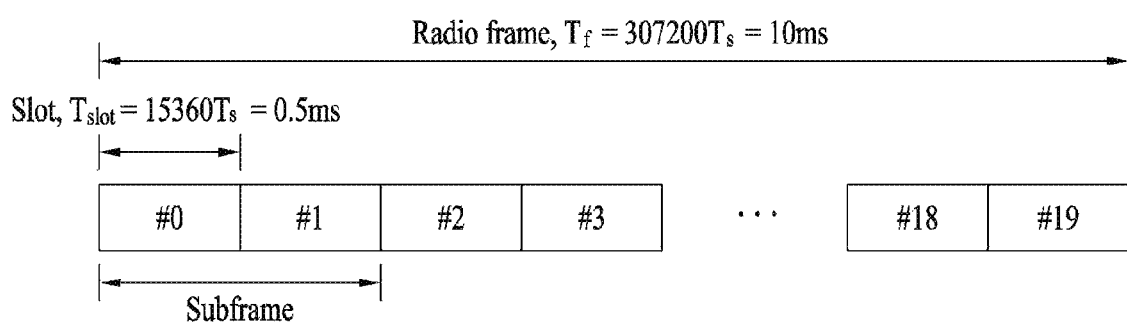
FIG. 4 is a diagram showing the structure of a radio frame used in a Long Term Evolution (LTE) system.

FIG. 4 is a diagram showing the structure of a radio frame used in a Long Term Evolution (LTE) system.

Referring to FIG. 4, the radio frame has a length of 10 ms ($327200 \times T_s$) and includes 10 subframes with the same size. Each of the subframes has a length of 1 ms and includes two slots. Each of the slots has a length of 0.5 ms ($15360 \times T_s$). $T_s$ denotes a sampling time, and is represented by $T_s=1/(15 \text{ kHz} \times 2048)=3.2552 \times 10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

Figure 5:
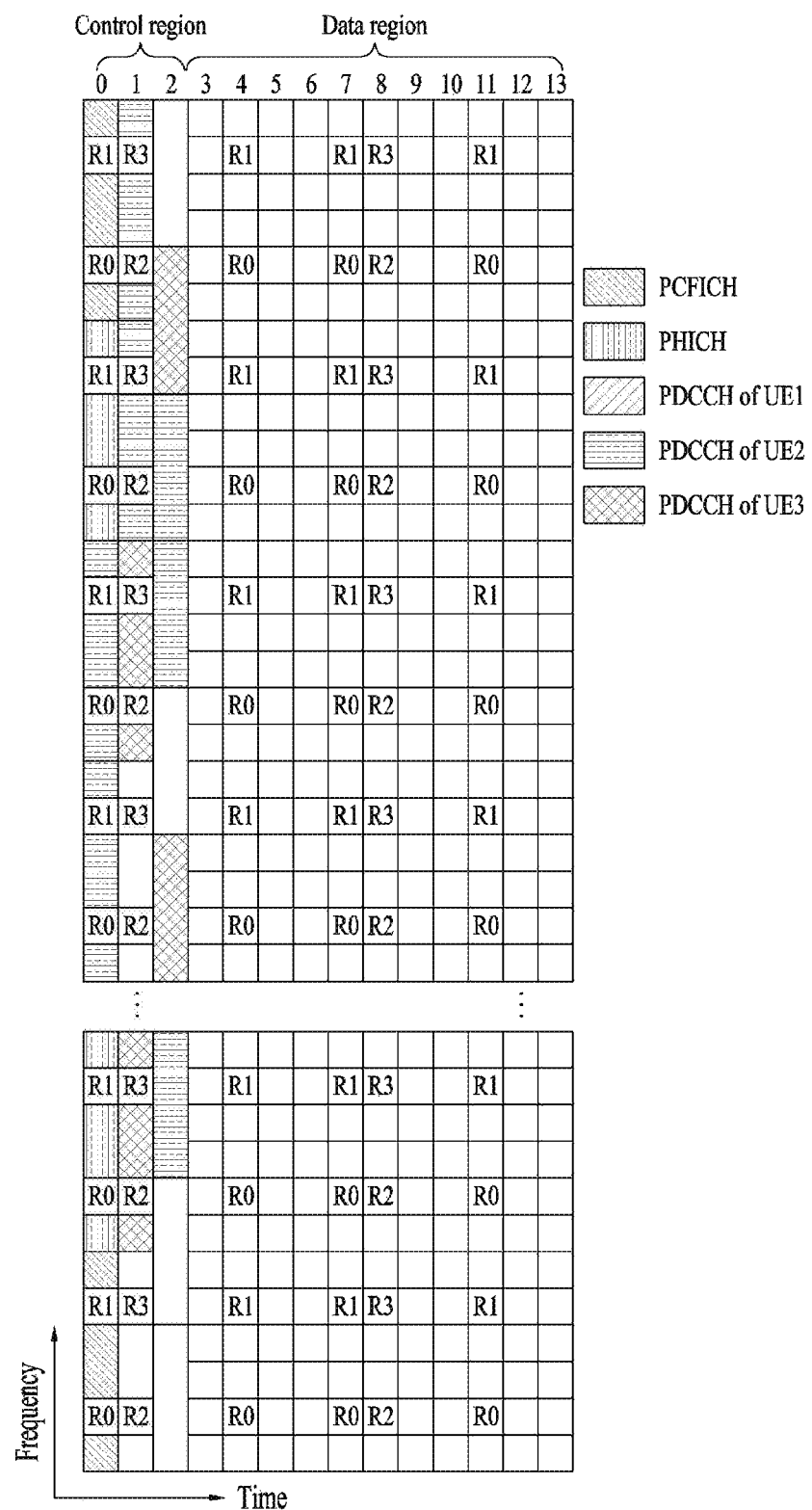
FIG. 5 is a diagram showing the structure of a downlink radio frame used in an LTE system.

FIG. 5 is a diagram showing a control channel included in a control region of one subframe in a downlink radio frame.

Referring to FIG. 5, a subframe includes 14 OFDM symbols. The first to third OFDM symbols are used as a control region and the remaining 13 to 11 OFDM symbols are used as a data region, according to subframe configuration. In FIG. 5, R1 to R4 denote reference signals (RS) or pilot signals for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a Physical Control Format Indicator Channel (PCFICH), a Physical Hybrid-ARQ Indicator Channel (PHICH), a Physical Downlink Control Channel (PDCCH), etc.

The Physical Control Format Indicator Channel (PCFICH) informs the UE of the number of OFDM symbols used for the PDCCH per subframe. The PCFICH is located at a first OFDM symbol and is configured prior to the PHICH and the PDCCH. The PCFICH includes four Resource Element Groups (REGs) and the REGs are dispersed in the control region based on a cell identity (ID). One REG includes four resource elements (REs). The PCFICH has a value of 1 to 3 or 2 to 4 according to bandwidth and is modulated using a Quadrature Phase Shift Keying (QPSK) scheme.

The Physical Hybrid-ARQ Indicator Channel (PHICH) is used to carry HARQ ACK/NACK for uplink transmission. That is, the PHICH refers to a channel via which DL ACK/NACK information for uplink HARQ is transmitted. The PHICH includes one REG and is scrambled on a cell-specific basis. ACK/NACK is indicated by one bit and is modulated using a binary phase shift keying (BPSK) scheme. The modulated ACK/NACK is repeatedly spread with a spreading factor (SF) of 2 or 4. A plurality of PHICHs mapped to the same resources configures a PHICH group. The number of PHICHs multiplexed in the PHICH group is determined according to the number of spreading codes. The PHICH (group) is repeated three times in order to obtain diversity gain in a frequency region and/or time region.

The Physical Downlink Control Channel (PDCCH) is allocated to the first n OFDM symbols of a subframe. Here, n is an integer of 1 or more and is indicated by a PCFICH. The PDCCH includes one or more Control Channel Elements (CCEs). The PDCCH informs each UE or a UE group of information associated with resource allocation of a Paging Channel (PCH) and a Downlink-Shared Channel (DL-SCH), both of which are transport channels, uplink scheduling grant, HARQ information, etc. The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using a radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

Figure 6:
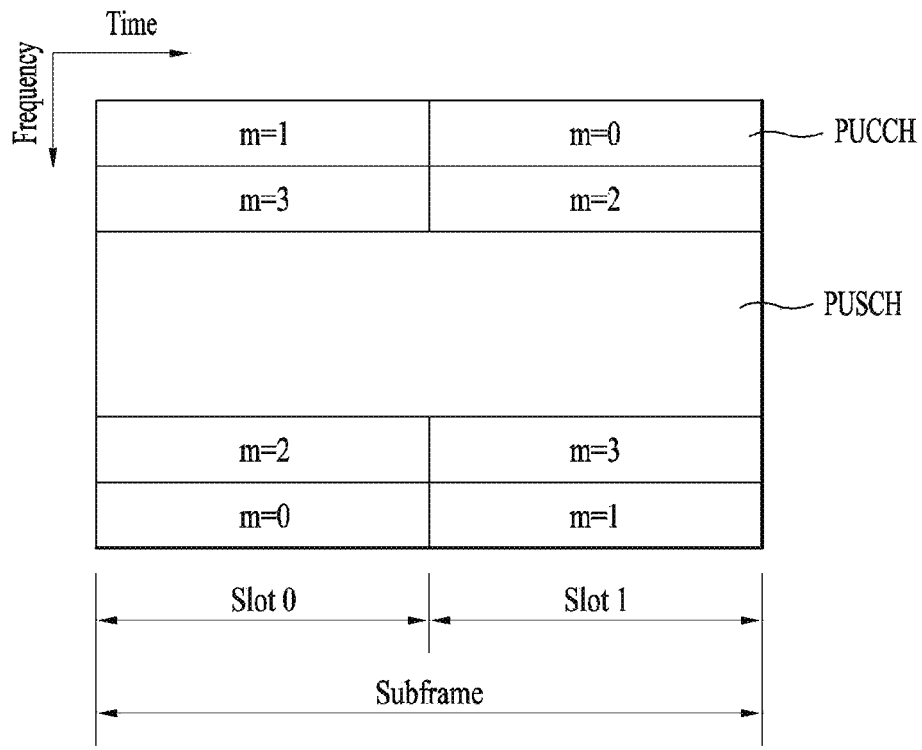
FIG. 6 is a diagram showing the structure of an uplink subframe used in an LTE system.

FIG. 6 is a diagram showing the structure of an uplink subframe used in an LTE system.

Referring to FIG. 6, an uplink subframe may be divided into a region to which a Physical Uplink Control Channel (PUCCH) carrying uplink control information is allocated and a region to which a Physical Uplink Shared Channel (PUSCH) carrying user data is allocated. A middle portion of the subframe is allocated to the PUSCH and both sides of a data region in a frequency domain are allocated to the PUCCH. Uplink control information transmitted on the PUCCH includes an ACK/NACK signal used for HARQ, a Channel Quality Indicator (CQI) indicating a downlink channel status, a rank indicator (RI) for MIMO, a scheduling request (SR) which is an uplink radio resource allocation request, etc. The PUCCH for one UE uses one resource block occupying different frequencies in slots within the subframe. Two slots use different resource blocks (or subcarriers) within the subframe. That is, two resource blocks allocated to the PUCCH are frequency-hopped in a slot boundary. FIG. 6 shows the case in which a PUCCH having m=0, a PUCCH having m=1, a PUCCH having m=2, and a PUCCH having m=3 are allocated to the subframe.

A time period capable of transmitting a sounding reference signal in a subframe corresponds to a period at which the last symbol is positioned in time axis in the subframe. The sounding reference signal is transmitted through a data transmission band in frequency axis. Sounding reference signals of a plurality of UEs transmitted via the last symbol of the same subframe can be distinguished from each other according to a frequency position.

PUCCH can be used for transmitting control information described in the following.

SR (scheduling request): Information used for requesting uplink UL-SCH resource. OOK (on-off keying) scheme is used to transmit the SR.

HARQ ACK/NACK: Response signal for a DL data packet (e.g., codeword) on PDSCH. This information indicates whether or not the DL data packet is successfully received. HARQ-ACK 1 bit is transmitted in response to a single DL codeword. HARQ-ACK 2 bits are transmitted in response to two DL codewords. HARQ-ACK response includes positive ACK (simply, ACK), negative ACK (NACK), and DTX or NACK/DTX. In this case, the HARQ-ACK is used in a manner of being mixed with HARQ ACK/NACK and ACK/NACK.

CSI (channel state information): Feedback information on a DL channel. MIMO (multiple input multiple output)-related feedback information includes an RI (rank indicator) and a PMI (precoding matrix indicator). 20 bits are used according to a subframe.

An amount of control information (UCI) capable of being transmitted by a user equipment in a subframe is dependent on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which an SRS (sounding reference signal) is set, the last SC-FDMA symbol of the subframe is also excluded. A reference signal is used for coherent detection of PUCCH. PUCCH supports various formats according to information transmitted on the PUCCH.

Table 1 shows a mapping relation between a PUCCH format and UCI in LTE system

TABLE 1

| PUCCH format | Uplink control information (UCI) |
| --- | --- |
| Format 1 | Scheduling request (SR) (unmodulated waveform) |
| Format 1a | 1-bit HARQ ACK/NACK with/without SR |
| Format 1b | 2-bit HARQ ACK/NACK with/without SR |
| Format 2 | CSI (20 coded bits) |
| Format 2 | CSI and 1- or 2-bit HARQ ACK/NACK (20 bits) for extended CP only |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | Maximum 24 bits HARQ ACK/NACK + SR |

When a network performs broadcast and multicast transmission transmitting the same data to a plurality of UEs via DL, the present invention proposes a method for a UE to efficiently transmit HARQ-ACK, i.e., ACK/NACK response. In particular, when broadcasting is performed by multiple cells in a manner that the multiple cells transmit the same transport block at the same time, the present invention proposes a HARQ-ACK scheme capable of efficiently performing the multi-cell broadcasting.

In this case, a UE transmitting the HARQ-ACK can be restricted to a UE in an RRC connected state (RRC_Connected UE). Yet, a UE receiving a broadcast signal only without any other traffic can also be extended to a UE in an RRC idle state (RRC_Idle UE) to enable the UE to participate in HARQ-ACK feedback. Of course, the HARQ-ACK feedback can be reported to the network through an RACH procedure or the like.

Figure 7:
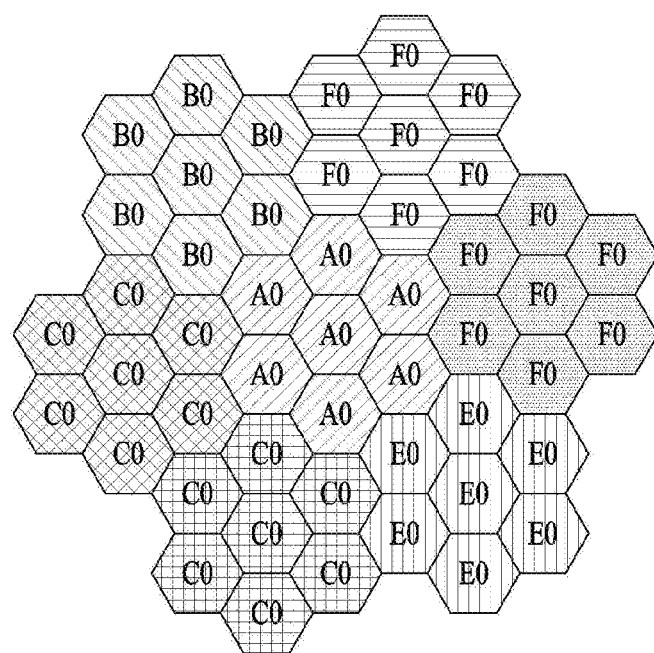
FIG. 7 is a diagram showing an example of transmitting a multicast/broadcast signal transmitted by a plurality of cells at the same time.

FIG. 7 is a diagram showing an example of transmitting a multicast/broadcast signal transmitted by a plurality of cells at the same time.

Referring to FIG. 7, assume that 7 adjacent cells form a single multicast cluster and transmit the same transport block together. In this case, since inter-cell interference disappears in the inside of the cluster and a signal of a different cell also includes information necessary for performing decoding, it may be able to improve reception performance of a UE.

As shown in FIG. 7, when multi-cell multicast is performed, a UE can transmit HARQ-ACK to an eNB to inform the eNB of whether or not a transport block is successfully received by the UE. The abovementioned operation can increase reliability of multicast/broadcast. This is because, if a network identifies that a partial UE fails to receive a specific transport block, it is able to retransmit the transport block.

However, since all UEs do not fail to receive the transport block, if retransmission is performed in all cells in which the initial transmission of the specific transport block is performed, unnecessary resource waste may occur. In particular, if all UEs succeed in receiving initial transmission in a specific cell belonging to a multicast cluster, it is not necessary for the cell to participate in retransmission. If the cell performs unicast data transmission of the cell, it is able to efficiently use a resource.

In order to solve the problem, according to the principle of the present invention, initial transmission is performed on multicast/broadcast transport blocks transmitted together in a plurality of cells. On the other hand, retransmission is performed in an individual cell. Generally speaking, a set of cells participating in retransmission becomes a subset of a set of cells participating in initial transmission.

Figure 8:
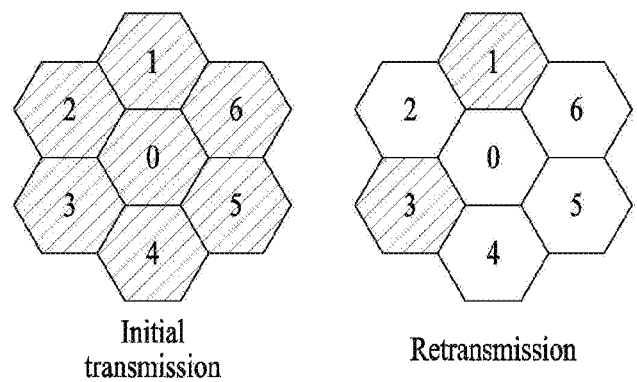
FIG. 8 is a diagram illustrating an example of performing retransmission in response to a multicast/broadcast transmission according to an embodiment of the present invention.

FIG. 8 is a diagram illustrating an example of performing retransmission in response to a multicast/broadcast transmission according to an embodiment of the present invention.

Referring to FIG. 8, cells 0 to 6 participate in initial transmission and perform multicast/broadcast transmission. In this case, if a UE reports HARQ-ACK, it may be able to identify a fact that there is a UE which has failed to receive the initial transmission in cells 1 and 3. Hence, retransmission is performed in the cells 1 and 3 only.

In order to implement the present invention, a HARQ-ACK signal transmitted by a UE should be cell-specific at least. This is because, when a network receives the HARQ-ACK signal from a UE, the network is able to perform retransmission only in a cell to which the UE belongs thereto.

Since multicast and broadcast are performed on a plurality of UEs, if a separate HARQ-ACK resource is allocated to an individual UE, it may cause excessive resource waste. In order to solve the resource waste, a plurality of the UEs share the same HARQ-ACK resource and a UE, which has failed to perform reception, can transmit a NACK signal only. According to the abovementioned method, although a network is unable to know a UE, which has failed to perform reception, the network is able to know whether or not there exist the UE, which has failed to perform reception. In particular, the network is able to know whether or not retransmission is necessary. Hence, the method is useful.

A method of making a HARQ-ACK signal for multi-cell multicast/broadcast to be a cell-specific signal can be implemented by a method 1, a method 2, or a combination thereof.

Method 1: A HARQ-ACK resource is cell-specific. Although the same transport block is received, a time/frequency resource in which HARQ-ACK is transmitted in response to the transport block is differently configured according to a cell. In addition, in case of CDM, not only the time/frequency resource but also a code resource can be differently configured according to a cell. According to the method 1, when a UE transmits HARQ-ACK, the UE transmits the HARQ-ACK using a resource of a cell to which the UE belongs thereto.

Method 2: A reference signal used for a HARQ-ACK signal is cell-specific. Although the same transport block is received, when HARQ-ACK is transmitted in response to the transport block, a parameter (e.g., a virtual cell ID) for generating a reference signal, which is transmitted together with the HARQ-ACK, is differently configured according to a cell. According to the method 2, when a UE transmits HARQ-ACK, the UE generates a reference signal using a parameter corresponding to a cell to which the UE belongs thereto.

If HARQ-ACK transmitted by a UE is cell-specific, it may be preferable to determine a reference cell for transmitting the HARQ-ACK by a cell to which the UE belongs thereto. In this case, the reference cell may correspond to a cell used for determining timing of HARQ-ACK transmission and/or a reference cell for measuring a pathloss in power control applied to the HARQ-ACK transmission. In particular, when a UL serving cell is different from a DL serving cell like HETNET where transmit power is different according to a cell, the UL serving cell can be configured as the reference cell for the HARQ-ACK transmission.

Meanwhile, as mentioned in the foregoing description, a UE in an RRC idle state can also transmit HARQ-ACK in response to multi-cell multicast. It is also necessary for the UE to define a reference cell for HARQ-ACK transmission. For example, the UE can determine a cell receiving SIB or paging as the reference cell. Or, the UE can determine a cell of which RSRP (reference signal received power) or RSRQ (reference signal received quality) is highest as the reference cell. If the UE in the RRC idle state determines a reference cell using the abovementioned schemes, the UE uses a cell-specific HARQ-ACK resource or a reference signal in accordance with the reference cell.

If retransmission is performed in a set of cells identical to a set of cells in which initial transmission is performed without applying the abovementioned principle, although consumption of a retransmission resource increases, it may be able to reduce overhead of a resource that makes HARQ-ACK to be cell-specific. In particular, if it is determined as UEs, which have failed to receive initial transmission, exist in almost all cells, for example, if many numbers of UEs are uniformly distributed to a plurality of cells, the abovementioned method can be appropriate.

In particular, it is preferable that a HARQ-ACK signal is not cell-specific and the HARQ-ACK signal is multicast cluster-specific. This is because it is able to share a single resource in the same cluster. In this case, HARQ-ACK resource and a reference signal vary according to a multicast cluster receiving a transport block. In the aspect of a UE transmitting and receiving unicast data, the UE determines HARQ-ACK different from HARQ-ACK for the unicast. For example, the UE differently determines a virtual cell ID for generating a reference signal according to unicast and multi-cell multicast, respectively.

In this case, for smooth multiplexing with a different UL signal, a reference cell for HARQ-ACK transmission timing and power control can be determined by a cell to which a UE belongs thereto. According to the abovementioned operation, a HARQ-ACK resource or a reference signal is cluster-specifically configured to overlap signals of UEs of a plurality of cells, whereas a reference cell is separately designated according to a UE to coexist with a different UL signal received by an individual cell.

Meanwhile, as mentioned in the foregoing description, if a set of cells participating in retransmission becomes a subset of a set of cells participating in initial transmission, a network selects a subset optimized to a given situation and configures the subset as a set of cells participating in retransmission. In this case, feedback of a UE can be usefully utilized. First of all, it is necessary to identify a cell to which a UE requiring retransmission belongs thereto. In addition, it is necessary to identify a situation at which the UE is facing. For example, it is necessary to identify whether or not channel quality with a serving cell is good. Or, when an adjacent cell performs transmission together, it is necessary to identify whether or not it is able to receive a benefit from the transmission.

It is preferable to transmit the UE feedback together with HARQ-ACK information. Or, it is preferable to induce the UE feedback from a HARQ-ACK signal. To this end, in the following, methods A) to C) are proposed in detail. Although it is able to independently manage the methods A) to C), the methods can also be managed in a manner of being combined.

Method A)

HARQ-ACK transmission resource or a reference signal is selected based on measurement of a UE. The UE measures RSRP or RSRQ of a serving cell of the UE. If a measurement value belongs to a certain region, the UE selects HARQ-ACK resource or a reference signal corresponding to the region and transmits the resource or the signal. The serving cell configures a region section of RSRP or RSRQ, e.g., an upper limit and a lower limit of the section and HARQ-ACK resource or a reference signal corresponding to the upper limit and the lower limit. Hence, if an eNB receives a specific HARQ-ACK, the eNB is able to identify whether or not a UE near the eNB fails to receive broadcast/multicast or the eNB is able to identify whether or not a UE far from the eNB fails to receive broadcast/multicast. Based on this, the eNB is able to control an amount of resources or power necessary for retransmission.

As an extension of the method A), HARQ-ACK resource or a reference signal can be determined according to RSRP of an adjacent cell or a region of RSRQ as well as RSRP or RSRQ of a serving cell. In this case, a network can identify whether or not a UE, which has transmitted specific HARQ-ACK, is close to a certain adjacent cell as well. Hence, the network can make the cell adjacent to the UE participate in retransmission if necessary.

In the operation of the method A), a reference signal corresponding to a measurement target may correspond to a cell-specific CRS transmitted by each cell. Yet, if a broadcast region is different from a cell region, a separate reference signal may become a reference signal.

For example, when a plurality of TPs (transmission points) transmit the same CRS in the same cell, if a part of the TPs participates in broadcast, such a specific reference signal as a CSI-RS may become a reference signal for the TPs. As a different example, if a plurality of cells form a single MBSFN (multimedia broadcast single frequency network) cluster and transmit the same signal together, a reference signal for measurement may correspond to an MBSFN reference signal transmitted together in the MBSFN cluster.

Method B)

A channel state can be identified via HARQ-ACK reception power. If a specific UE transmits HARQ-ACK, each cell can identify a channel state with a corresponding UE based on reception power of the HARQ-ACK. Hence, a cell selects an appropriate set of cells based on the identified channel state and can make the cells participate in retransmission. For example, if cells are received with power equal to or greater than a specific level, the cells can participate in retransmission.

However, if a plurality of UEs use the same HARQ-ACK resource or the same reference signal together, since a network examines the sum of reception power of two UE signals, it is difficult to precisely select a set of cells to be used for retransmission. In this case, if a UE randomly selects a HARQ-ACK resource or a reference signal, the abovementioned problem can be mitigated. A serving cell configures a set of time/frequency/code resources and/or a set of reference signals corresponding to the set of time/frequency/code resources. A UE randomly selects a part of resources/reference signals from among the sets and transmits a HARQ-ACK signal using the selected resource/reference signal. In order to prevent the same UE from consistently selecting the same HARQ-ACK resource, the resource/reference signal selected by the UE can be configured by a hashing function value of a UE ID. The hashing function value may vary over time.

Method C)

Measurement information of a UE can be added to HARQ-ACK. When a UE transmits HARQ-ACK in response to a multicast/broadcast signal, the UE can add RSRP/RSRQ measurement information of a serving cell and/or an adjacent cell to HARQ-ACK information. Having received the RSRP/RSRQ measurement information, a network is able to identify a UE requiring retransmission. The measurement information varies according to a UE and requires a time/frequency resource of a size equal to or greater than a certain size. Hence, in case of a UE in an RRC idle state, it is preferable to manage the UE together with the scheme of randomly selecting a resource/reference signal mentioned in the Method B).

Although a plurality of UEs select the same time/frequency resource and transmit HARQ-ACK, if the UEs use a different reference signal, it may have the possibility that it is able to successfully decode all or a part of messages of two UEs. Or, in this case, although it fails to decode the messages, since a network is able to identify whether or not a reference signal of HARQ-ACK exists, the network can still operate based on a measurement report. Yet, it is still necessary to identify whether or not there is a UE failed to receive initial transmission to determine whether or not retransmission is necessary. In case of a UE in an RRC connected state, since the UE is already reporting RSRP/RSRQ via an RRM measurement reporting procedure, it may be unnecessary for the UE to perform the abovementioned procedure.

The aforementioned principle of the present invention is not restricted to a broadcast/multicast situation in which an eNB transmits the broadcast/multicast to a UE. The principle can also be applied to a broadcast/multicast situation in a more general wireless communication.

For example, when a UE directly transmits a broadcast/multicast signal to an adjacent UE, i.e., in case of D2D (device-to-device) communication, if a UE1 transmits data to adjacent UEs via D2D, a UE to which the data is transmitted among the adjacent UEs attempts to receive the data and can inform the UE1 of whether or not the data is successfully decoded via HARQ-ACK. If the UE1 is able to identify whether a UE of a certain channel state succeeds/fails to receive data via the HARQ-ACK, the UE1 is able to appropriately control a transmission parameter (e.g., transmit power or MCS (modulation and coding scheme) level) in a retransmission of the data or a next data transmission. To this end, the aforementioned methods A) to C) can be applied.

In case of the method A), when UEs, which attempted to receive the data of the UE1, transmit HARQ-ACK to the UE1 using a resource or a reference signal, a position of the resource or the reference signal is determined by measuring a signal transmitted by the UE1. In this case, when the signal is measured, the measurement may correspond to measurement of a data channel itself (e.g., reception power of a DM-RS of the data channel) or measurement of a different channel (e.g., a discovery channel indicating the existence of the UE1) periodically transmitted by the UE1. Or, the measurement may correspond to measurement on a control channel that performs scheduling on the data channel.

In case of the method B), the UE1 receives HARQ-ACK and identifies a UE, which has transmitted the HARQ-ACK, of a certain channel state via reception power of the HARQ-ACK. To this end, HARQ-ACK transmit power of a UE can be fixed. Hence, if HARQ-ACK reception power is weak, it is able to identify that a UE of which channel loss is big has transmitted the HARQ-ACK.

In case of the method C), HARQ-ACK can include a measurement value for a transmission channel of the UE1 mentioned earlier in the method A). The measurement value may have a form such as RSRP/RSRQ or a form of an MCS level or a channel quality indicator (CQI) which is determined as appropriated in the aspect of a reception UE. Or, the measurement value may have a form indicating whether power necessary for demodulating a corresponding data channel is high or low in the aspect of the reception UE compared to current power.

As a special case for the method A), i.e., a scheme of selecting a HARQ-ACK transmission resource or a reference signal based on measurement of a UE, if a specific measurement condition is satisfied, HARQ-ACK may not be transmitted. In particular, if a measurement result satisfies a specific condition, a corresponding HARQ-ACK resource is not allocated.

For example, if RSRP measurement or RSRQ measurement is equal to or lower than a prescribed level, it may be able to configure HARQ-ACK not to be transmitted. When a UE located at the outside of coverage receives scheduling information to transmit data but fails to receive the data, it may be able to make the UE not to transmit HARQ-ACK. In particular, the abovementioned example can be used for the purpose of preventing an operation of unnecessarily performing retransmission for the UE located at the outside of coverage.

As a different example, if RSRP measurement or RSRQ measurement is equal to or greater than a prescribed level, it may be able to configure HARQ-ACK not to be transmitted. According to the present example, if a channel state is very good and it is highly probable that UEs are able to successfully perform reception, it may be able to make the UEs not to transmit HARQ-ACK. Hence, a resource for transmitting the HARQ-ACK can be used for a different usage.

In the foregoing description, multicast/broadcast is mainly assumed for explanation of the present invention. A similar operation can also be used for unicast. In particular, when a network is unable to precisely identify a position of a UE configured to receive a specific unicast data, the network can transmit unicast data in a plurality of cells near an anticipated position. In case of D2D, when data itself corresponds to unicast, if there is no precise connection between a reception UE and a transmission UE, the present invention can be utilized.

Figure 9:
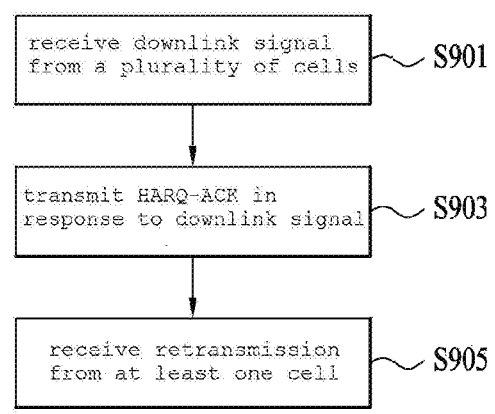
FIG. 9 is a flowchart illustrating a method of performing HARQ-ACK feedback and retransmission in response to a multicast/broadcast signal according to an embodiment of the present invention.

FIG. 9 is a flowchart illustrating a method of performing HARQ-ACK feedback and retransmission in response to a multicast/broadcast signal according to an embodiment of the present invention.

Referring to FIG. 9, a UE receives a DL signal from a plurality of cells in the step S901. As mentioned in the foregoing description, it is preferable that the DL signal corresponds to a broadcast signal or a multicast signal transmitted from a plurality of the cells.

Subsequently, in the step S903, the UE transmits HARQ-ACK (i.e., ACK/NACK response) to a serving cell among a plurality of the cells in response to the DL signal. In particular, since multicast and broadcast are targeting a plurality of UEs, if a separate HARQ-ACK resource is allocated to an individual UE, it may cause excessive resource waste. Hence, a resource for transmitting the ACK/NACK response or a reference signal transmitted together with the ACK/NACK response is cell-specific.

Lastly, in the step S905, the UE receives retransmission for the DL signal from at least one cell among a plurality of the cells.

In particular, in order to select the at least one cell, the UE measures channel quality with the serving cell and may be able to select a resource for transmitting the ACK/NACK response or a reference signal transmitted together with the ACK/NACK response corresponding to a measurement result value. Of course, the measurement result value itself can be transmitted together with the ACK/NACK response. In addition, the UE measures channel quality with at least one adjacent cell and can transmit information on the channel quality with the at least one adjacent cell to the serving cell together with the ACK/NACK response. In particular, the at least one cell is selected based on the channel quality with the serving cell and the channel quality with the at least one adjacent cell.

Figure 10:
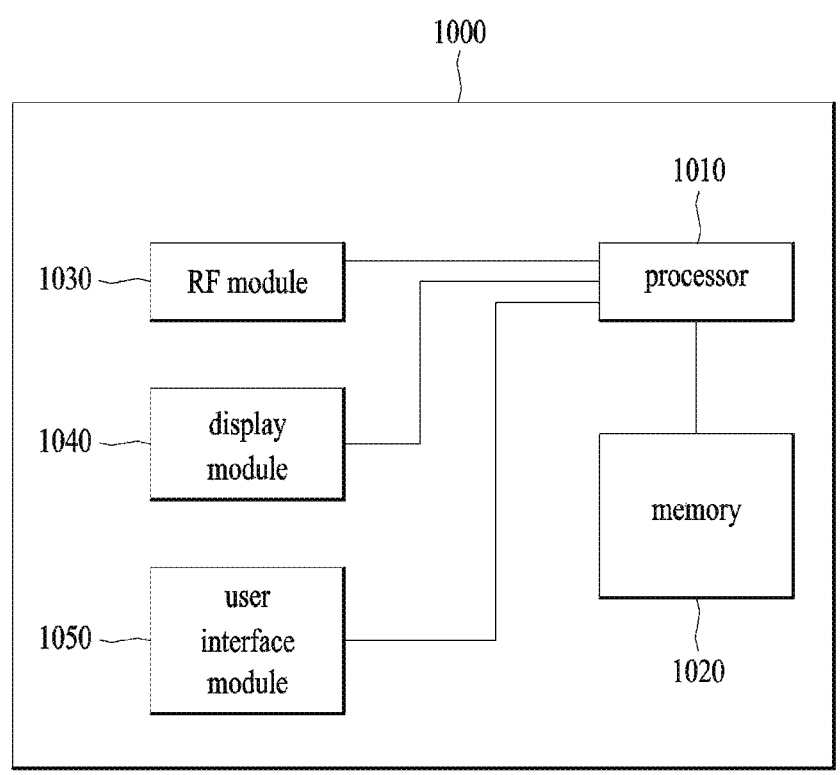
FIG. 10 is a block diagram of a communication apparatus according to one embodiment of the present invention.

FIG. 10 is a block diagram of a communication apparatus according to one embodiment of the present invention.

Referring to FIG. 10, a communication apparatus 1000 includes a processor 1010, a memory 1020, a Radio Frequency (RF) module 1030, a display module 1040 and a user interface module 1050.

The communication apparatus 1000 is shown for convenience of description and some modules thereof may be omitted. In addition, the communication apparatus 1000 may further include necessary modules. In addition, some modules of the communication apparatus 1000 may be subdivided. The processor 1010 is configured to perform an operation of the embodiment of the present invention described with reference to the drawings. For a detailed description of the operation of the processor 1010, reference may be made to the description associated with FIGS. 1 to 9.

The memory 1020 is connected to the processor 1010 so as to store an operating system, an application, program code, data and the like. The RF module 1030 is connected to the processor 1010 so as to perform a function for converting a baseband signal into a radio signal or converting a radio signal into a baseband signal. The RF module 1030 performs analog conversion, amplification, filtering and frequency up-conversion or inverse processes thereof. The display module 1040 is connected to the processor 1010 so as to display a variety of information. As the display module 1040, although not limited thereto, a well-known device such as a Liquid Crystal Display (LCD), a Light Emitting Diode (LED), or an Organic Light Emitting Diode (OLED) may be used. The user interface module 1050 is connected to the processor 1010 and may be configured by a combination of well-known user interfaces such as a keypad and a touch screen.

The above-described embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations disclosed in the embodiments of the present invention may be varied. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

In this document, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms fixed station, Node B, eNode B (eNB), access point, etc.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although a method of transmitting ACK/NACK response in response to a broadcast signal/multicast signal in a wireless communication system and an apparatus therefor are described with reference to examples applied to 3GPP LTE system, it may be applicable to various kinds of wireless communication systems as well as the 3GPP LTE system.

What is claimed is:

1. A method of transmitting and receiving a signal by a user equipment (UE) in a wireless communication system in which a plurality of cells form a multicast cluster, the method comprising:
receiving a first downlink signal from a first cell group;
transmitting an ACK/NACK (Acknowledgement/Negative ACK) response to a serving cell among the first cell group in response to the first downlink signal; and
receiving a second downlink signal from a second cell group, wherein the second downlink signal is a retransmission for the first downlink signal, and
wherein the first cell group is all of the plurality of the cells of the multicast cluster, and
wherein the second cell group is a subset of the first cell group and a number of cells in the second cell group is less than the first cell group, and
wherein the second cell group is identified based on a channel state with the serving cell, and
wherein the channel state with the serving cell is identified based on information on a channel quality measurement with the serving cell and a power of the ACK/NACK response.

2. The method of claim 1, wherein a resource for transmitting the ACK/NACK response or a reference signal transmitted together with the ACK/NACK response is cell-specific.

3. The method of claim 1, wherein the first downlink signal corresponds to a broadcast signal or a multicast signal transmitted from the first cell group.

4. The method of claim 2, wherein
the resource for transmitting the ACK/NACK response or the reference signal transmitted together with the ACK/NACK response is selected based on the information on the channel quality measurement with the serving cell.

5. The method of claim 1, wherein the transmitting the ACK/NACK response comprises:
measuring channel quality with at least one adjacent cell; and
transmitting information on the channel quality with the at least one adjacent cell to the serving cell together with the ACK/NACK response.

6. The method of claim 5, wherein the second cell group is identified based on the channel state with the serving cell, and the channel quality with the at least one adjacent cell.

7. A user equipment (UE) in a wireless communication system in which a plurality of cells form a multicast cluster, the UE comprising:
a wireless communication module; and
a processor configured to:
receive a first downlink signal from a first cell group,
transmit an ACK/NACK (Acknowledgement/Negative ACK) response to a serving cell among the first cell group in response to the first downlink signal, and
receive a second downlink signal from a second cell group, wherein the second downlink signal is a retransmission for the first downlink signal, and
wherein the first cell group is all of the plurality of the cells of the multicast cluster, and
wherein the second cell group is a subset of the first cell group and a number of cells in the second cell group is less than the first cell group, and
wherein the second cell group is identified based on a channel state with the serving cell, and
wherein the channel state with the serving cell is identified based on information on a channel quality measurement with the serving cell and a power of the ACK/NACK response.

8. The UE of claim 7, wherein a resource for transmitting the ACK/NACK response or a reference signal transmitted together with the ACK/NACK response is cell-specific.

9. The UE of claim 7, wherein the first downlink signal corresponds to a broadcast signal or a multicast signal transmitted from the first cell group.

10. The UE of claim 8, wherein the resource for transmitting the ACK/NACK response or the reference signal transmitted together with the ACK/NACK response is selected based on the information on the channel quality measurement with the serving cell.

11. The UE of claim 7, wherein the processor is configured to measure channel quality with at least one adjacent cell and transmit information on the channel quality with the at least one adjacent cell to the serving cell together with the ACK/NACK response.

12. The UE of claim 11, wherein the second cell group is identified based on the channel state with the serving cell, and the channel quality with the at least one adjacent cell.

\* \* \* \* \*